July 19, 1960  E. COOKSON  2,945,391

SPROCKET CHAINS

Filed Oct. 22, 1958

United States Patent Office 2,945,391
Patented July 19, 1960

2,945,391

SPROCKET CHAINS

Eric Cookson, 14 Wilkinson Ave., Blackpool,
Lancashire, England

Filed Oct. 22, 1958, Ser. No. 769,000

Claims priority, application Great Britain Nov. 15, 1957

7 Claims. (Cl. 74—250)

This invention relates to sprocket chains.

The invention consists of a sprocket chain comprising means to hold the chain substantially rigid, said holding means being engageable with a portion of a sprocket or sprocket casing to release the holding means to enable the chain to pass round the sprocket.

In one embodiment the holding means is in the form of an individual member attached to each link of the chain and arranged to hold an adjacent link substantially rigid therewith.

Conveniently each individual member has a projection which is urged by the inherent elasticity of the member to protrude through an aperture provided in the link and to engage a slot in the adjacent link to hold the adjacent link substantially rigid, and engageable with the tooth of a sprocket to be moved thereby against elasticity of the member to release the said adjacent link.

The invention further consists of a link for a chain as set forth in the three preceding paragraphs comprising a spring member having a projection, and having an aperture for the projection and a slot arranged to co-operate with a corresponding projection on an adjacent link.

Alternatively, some of the links may be provided with individual member holding the two adjacent links rigid therewith.

The invention will be further described with reference to the accompanying drawings.

In the accompanying drawings:

Figures 1 and 2 show how a locking spring 1 is rigidly secured to each link and projects through an aperture in the link and co-operates at 4 with a slot in the adjacent link.

Figure 1:
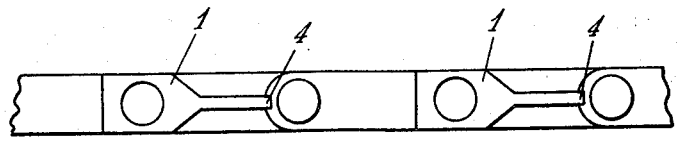
Figure 1 is an elevation.
Figure 4:
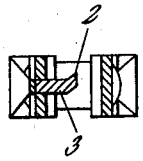
Figures 3 and 4 are sections on lines III—III and IV—IV respectively of Figure 2.
Figure 3:
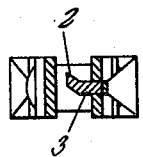
Figure 2:
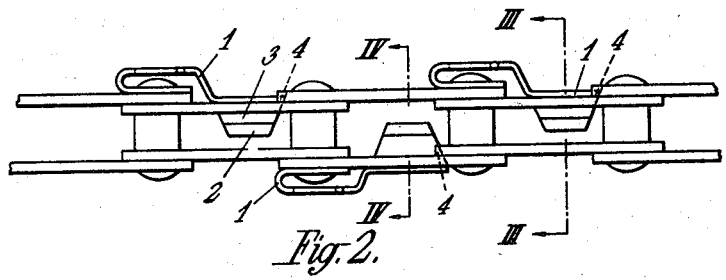
Figure 2 is a plan of a portion of chain according to the invention.

Figures 3 and 4 illustrate the manner in which the end 2 of projection 3 on the spring 1 is bent upward so that on engagement by a tooth of a sprocket the projection 3 is moved outwardly against its inherent spring action. On leaving the sprocket the projection is released and returns to the position illustrated in which it holds the adjacent links substantially rigidly together.

Figure 5:
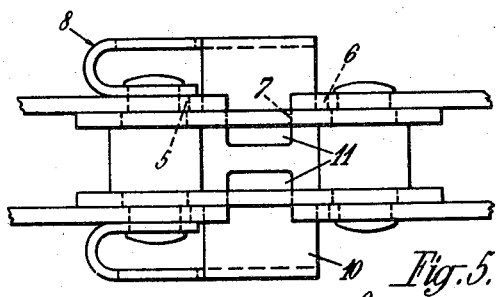
Figures 5 and 6 are respectively plan and side elevational views of a modified embodiment.
Figure 6:
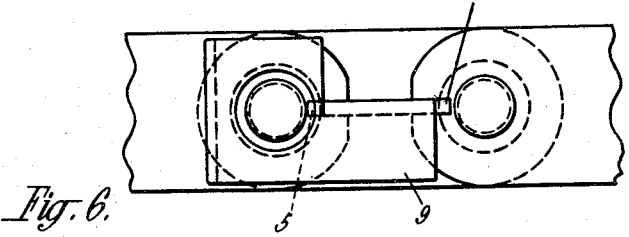

Figures 5 and 6 illustrate an embodiment of a chain in which the spring members are of simpler and more robust construction and are capable of holding three links of the chain in alignment. For this purpose slots 5 and 6 are provided in both adjacent links in alignment with the aperture 7 in the link. The spring members consist of a U-shaped portion 8 having one arm extended at 9, with one part of the extended portion being bent over to form a projection 10. A tongue 11 is formed on the end of projection 10 to pass through aperture 7 and engage the teeth of the sprocket to release slots 5 and 6 from the projection.

It will be understood that the locking springs prevent vertical movement of the chain illustrated and that the construction of the chain is such as to prevent lateral movement substantially as in conventional chain of this kind.

A chain according to the invention is particularly useful for such applications as the control of inaccessible windows and ventilators where its rigidity is of particular advantage in avoiding difficulties due to slackness of the chain, e.g. inadvertent removal of chain from sprocket, imprecision of adjustment.

Various modifications may be made within the scope of the invention. For example, a link may have a single locking means as in Figs. 1 to 4 or double locking means as in Figs. 5 and 6. It will be hence be understood that the invention is not limited to the embodiments shown by way of example in the drawings.

I claim:

1. A sprocket chain comprising a plurality of links, pivot members pivotally joining successive links, at least each alternate link having a slot therein intermediate its ends and at least one adjacent link having a slot in its end portion registering with said first mentioned slot when said links are aligned, a spring associated with each of said first mentioned links and secured by one of said pivot members, a projection carried by said spring and extending into said slots to lock said links in alignment, and means for retracting said projection to release said links.

2. A sprocket chain according to claim 1, in which said first mentioned link comprises spaced side bars and in which said projection extends into the space between said side bars in position to be engaged by a tooth of a sprocket wheel on which said chain runs to retract said projection.

3. A sprocket chain comprising: a plurality of links, each link comprising two flat elongated side pieces arranged facing and parallel to each other, each said side piece having sides and longitudinal and perpendicular edges, oppositely disposed end portions and a middle portion intermediate said end portions, spacing means secured between said facing side pieces at said end portions for transversely spacing said parallel side pieces from each other, each said end portion being adapted to lap, side to side, the end portion of a corresponding side piece of an adjoining link, pivot means transversely joining the lapping end portions of said links, locking means separately engaging each link to a lapping end portion of the following link when said corresponding longitudinal edges are aligned, said locking means for locking said associated links and respectively successive links in alignment with one another, and each said locking means being movable between a locked position in which it engages an associated link and the lapping end portions of the following link to lock successive links in alignment, and an unlocked position in which said associated link and lapping link end portions are released for relative pivotal movement; spring means biasing said locking means to lock position and releasing means for moving said locking means to unlock position.

4. A sprocket chain according to claim 3, in which a locking means and spring means comprise a leaf locking spring rigidly secured to a pivot means and a projection carried by said spring and engageable with an associated link and the lapping end portion of the following link.

5. A sprocket chain according to claim 3, in which said locking means and spring means comprise a locking spring rigidly secured to alternate pivot means and a projection carried by said spring and engageable with said associated link and the end portions of the two adjoining links.

6. A sprocket chain according to claim 3, in which said lapped end portions define slots in said links, and said links define apertures in alignment with said slots in adjoining link end portions when said corresponding longitudinal edges of the side pieces of successive links are in alignment, both the said slot and said aperture for simultaneously engaging, said locking means.

7. A sprocket chain according to claim 3, in which said releasing means comprises a projection engageable with a tooth of a sprocket on which said chain runs to move said locking means to unlocked position.

References Cited in the file of this patent

UNITED STATES PATENTS

| | | |
|---|---|---|
| 1,570,014 | Stevens | Jan. 19, 1926 |
| 2,219,125 | Bremer | Oct. 22, 1940 |

FOREIGN PATENTS

| | | |
|---|---|---|
| 725,924 | France | Feb. 22, 1932 |